United States Patent [19]

Felton et al.

[11] Patent Number: 4,754,390

[45] Date of Patent: Jun. 28, 1988

[54] CONDUCTIVELY COOLED SWITCHING REGULATOR

[75] Inventors: Bruce C. Felton, Saugerties; William B. McCoy, New Paltz, both of N.Y.

[73] Assignee: International Business Machines Corporation, Armonk, N.Y.

[21] Appl. No.: 43,733

[22] Filed: Apr. 29, 1987

[51] Int. Cl.⁴ ........................................ H02M 1/00
[52] U.S. Cl. ................................ 363/141; 361/388
[58] Field of Search ................ 363/68, 126, 141, 144; 361/381, 386, 388

[56] References Cited

U.S. PATENT DOCUMENTS 4,506,320 3/1985 Koroncai et al. .................. 363/141

*Primary Examiner*—Peter S. Wong
*Attorney, Agent, or Firm*—Joseph J. Connerton

[57] ABSTRACT

A switching regulator designed for high power high current transfer is adapted for reducing leakage inductance and heat dissipation. The switching regulator comprises a transformer/receiver assembly utilizing a planar winding configuration in the transformer. The planar secondary winding is a short, large area thermopath interface for heat dissipation in a cooling medium.

4 Claims, 2 Drawing Sheets

CONDUCTIVELY COOLED SWITCHING REGULATOR

RELATED PATENT APPLICATION

Application Ser. No. 07/081,041, a continuation-in-part of application Ser. No. 06/793,520, "DC to DC Converter with a Single Magnetic Component and Low Ripple" filed by John B. Gillett et al Oct. 31, 1985.

FIELD OF THE INVENTION

The present invention relates to a switching regulator, and more particularly to a switching regular including a planar conductively cooled transformer adapted for high output current.

DESCRIPTION OF THE PRIOR ART

Switching regulators used in conventional power supplies associated with large data processing systems require output transformers which handle multiple kilowatts of power, have very high output current and which are required to meet various regulatory requirements such as UL, IEC, etc. Conventional design of such transformers leads to large, bulky structures having major size and weight impacts, large leakage inductance, high temperature rise and associated cooling problems.

DESCRIPTION OF THE INVENTION

The invention described in the instant application provides elimination of or major improvements in the above described problems of the prior art including an improved transformer structure. In the preferred embodiment of the invention, the transformer primary windings are juxtaposed to the secondary windings which, in turn, extend in one direction from the core for the minimum distance needed to allow rectifier mounting and output connections. This configuration minimizes leakage inductance in the secondary rectifier path. In the preferred embodiment of the invention, the secondary winding(s) is formed in a planar configuration by a pair of plates, one overlying the other and configured to define a center tapped secondary winding. Heat produced in the primary winding(s) and output rectifiers is also conducted to and spread into the secondary winding(s). In the preferred embodiment of the invention, the secondary winding is extended in the other direction from the core to improve thermal conduction from the winding. All areas of the secondary beyond the primary coil are mounted on a heat sink, preferable electrical conductive with a flat surface, to receive the secondary conductors and having a thin insulation layer between the secondary winding(s) and the heat sink. Thus, all heat, including that resulting from primary, secondary and rectifier losses, is conducted to the heat sink through a short, large area thermo path interface.

Since the principal heat flow is orthogonal to the current flow, the heat sink may be completely outside or separate from the electrical circuit. The electrically conductive heat sink reduces leakage inductance by allowing image currents, corresponding to currents between the transformer and rectifier circuits, to flow to produce a ground plane effect which reduces leakage inductance. Thus, the instant invention provides a small, low leakage structure with excellent heat transfer characteristics.

Accordingly, a primary object of the present invention to provide an improved switching regulator assembly having high power and current characteristics with compact physical packaging.

Another object of the present invention is to provide an improved switching regulator design having reduced leakage inductance of the transformer/rectifier assembly.

Still another object of the present invention is to provide an improved switching regulator having improved heat dissipation characteristics in which all heat including primary, secondary and rectifier losses is conducted through a short, large area thermo interface to a heat sink.

The foregoing and other objects, features and advantages of the invention will be apparent from the more particular description of the preferred embodiments of the invention, as illustrated in the accompanying drawings.

DESCRIPTION OF THE PREFERRED EMBODIMENT OF THE INVENTION

Figure 1:
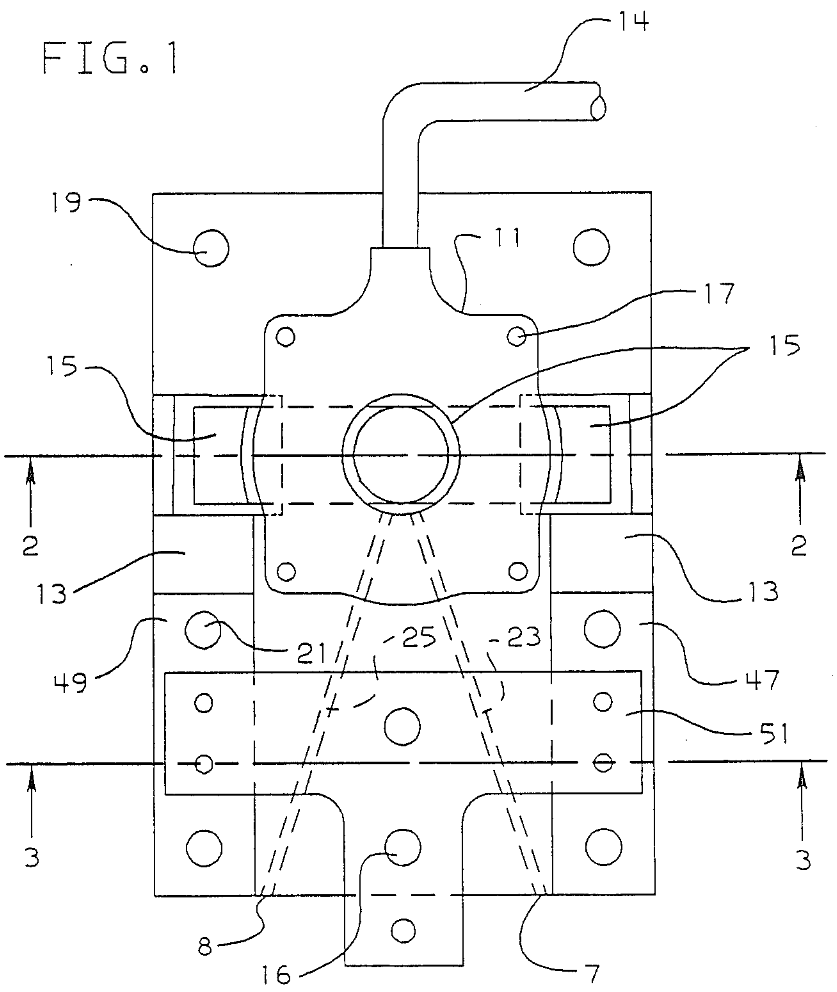
FIG. 1 is a top view of a partially assembled planar conductively cooled transformer.

Before discussing the specific details of the instant invention, some general and specific problems associated with conventional switching regulator structures will be considered. As previously noted, power supplies for large data processing systems must provide high power and output current. Voltage levels in data processors are relatively low, in a nominal range of 1–6 volts, while the currents may encompass hundreds of amperes. It has also become critical in these applications for reasons hereinafter described to package the power supplies close to the load to minimize high current distribution, thus avoiding major size, weight and cost problems. At the same time, packaging of such power supplies must be accomplished without increasing the distances between load partitions which, in turn, introduces logic signal delays and degrades performance of the overall system. Size has, therefore, become one if not the most critical parameter in the design of power regulators.

It is well known in the switching regulator art that operation at higher frequencies leads to smaller size, weight, etc. To achieve high frequency with its associated high power and current, it is necessary to make the physical packaging of the transformer and rectifiers as small as possible due to current switching in the transformer windings and rectifiers. In such designs, voltages must be limited to values below the breakdown rating of the switches and rectifiers, and finite inductances are inevitable.

Given the low voltage, high current and finite inductance requirements, switching or commutation of current requires time. The commutation time increases in direct proportion to the magnitude of the current and, in practical designs, is limited to a small percentage of the overall cycle time. Thus, the maximum operating frequency of current switching regulators is limited by the current, voltage and inductance parameters in the circuit.

The inductance which primarily affects the commutation time is that of the transformer/rectifier assembly itself. This inductance may be reduced by shortening the physical path around the transformer secondary/-rectifier circuit, by minimizing the separation between primary to secondary and secondary to secondary windings and by using the thinnest possible conductors arranged in a planar configuration, such that currents in the windings are also images of each other.

All of the above approaches to reducing leakage inductance tend to increase heat density and to produce excessive temperature rise unless effective cooling is provided. Heat transfer in conventional, concentric wound transformers is impeded by the need to pass through multiple layers of conductors and insulators, while cooling via conduction through the core is severely constrained due to the poor thermal conductivity of conventional high frequency core materials. The addition of rods, plates, bars, or related hardware to conduct heat, to control spacing of windings or to facilitate passage of cooling fluid tend to increase both the size and leakage inductance of the switching regulator and may, in fact, increase the total heat produced. It is to a regulator design operating within the above described environment which eliminates or substantially reduces the interlocking undesirable parameters of conventional switching regulator assemblies that the instant invention is directed.

Referring now to the drawings and more particularly to FIG. 1 thereof, there is illustrated a top view of an assembled planar conductively cooled transformer having a primary coil 11, a secondary coil in the form of plate 13, and a core 15. The upper core half, the bottom cooling plates and the mounting hardware are of conventional design and have been omitted from FIG. 2 in the interest of clarity. For purposes of description, dual primary windings 10 and 11, and a two turn center tap secondary winding such as used with a bridge or push-pull converter configuration is shown by way of example. However, a single primary and/or secondary winding could be used, depending on design specification requirements. The bottom cooling plate 35, the output diodes 47, 49 and the connection-hardware are shown in the section view of FIG. 3. The secondary winding or windings 13 takes the form of a thin, planar structure. If multiple secondaries are required, similar thin structures are configured in a coplanar arrangement separated by a minimum thickness of insulation.

Primary windings are formed from relatively thin spiral conductors and insulated with a minimum of dielectric to provide creepage and spacing required by safety standards. Planar primaries, when utilized, are attached directly to the secondaries. With multiple secondaries, the preferred transformer configuration is to divide the total primary into two series connected coils mounted on opposite sides of the secondary winding or windings. This approach gives the lowest possible leakage inductance internal to the winding structure.

Figure 2:
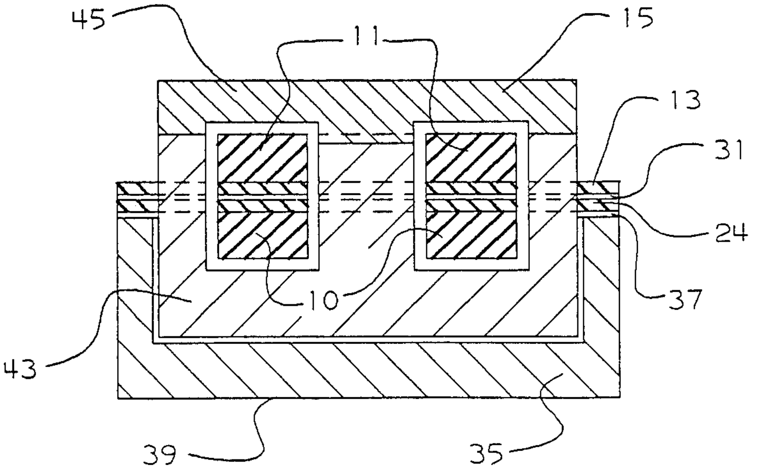
FIG. 2 is a cross-section of the planar conductively cooled transformer taken along lines 2—2 of FIG. 1.

The secondary coil 13 is extended in one direction from the core 15 for the minimum distance needed to allow rectifier mounting and output connections. For multiple secondaries, the upper and lower extensions of secondary winding 13 are maintained co-planar, with minimum insulation over the largest possible area consistent with rectifier mounting. This configuration minimizes leakage inductance in the secondary/rectifier path. Heat produced in the primary windings 11 and output rectifiers 47, 49 is conducted to and spread into the secondary windings 13 and then conducted to the bottom cooling plate 35 (FIG. 2).

In the preferred embodiment of the invention, the secondary winding comprises a pair of coplanar plates which extend in opposite directions from the core 15. The entire area of the secondary winding 13 beyond the primary coil 11 is mounted on an electrically conductive heat sink 35 (FIG. 2), with a thin insulation area 37 between the planar secondary winding 13 and heat sink 35. All heat generated by primary and secondary windings and rectifier losses is conducted to the heat sink through this short, large area thermo interface. Thus, the principle heat flow is orthogonal to the current, allowing the heat sink to be completely outside of or separated from the electrical circuit. Further, the thermal resistance is minimized by the short large area thermal path.

Figure 3:
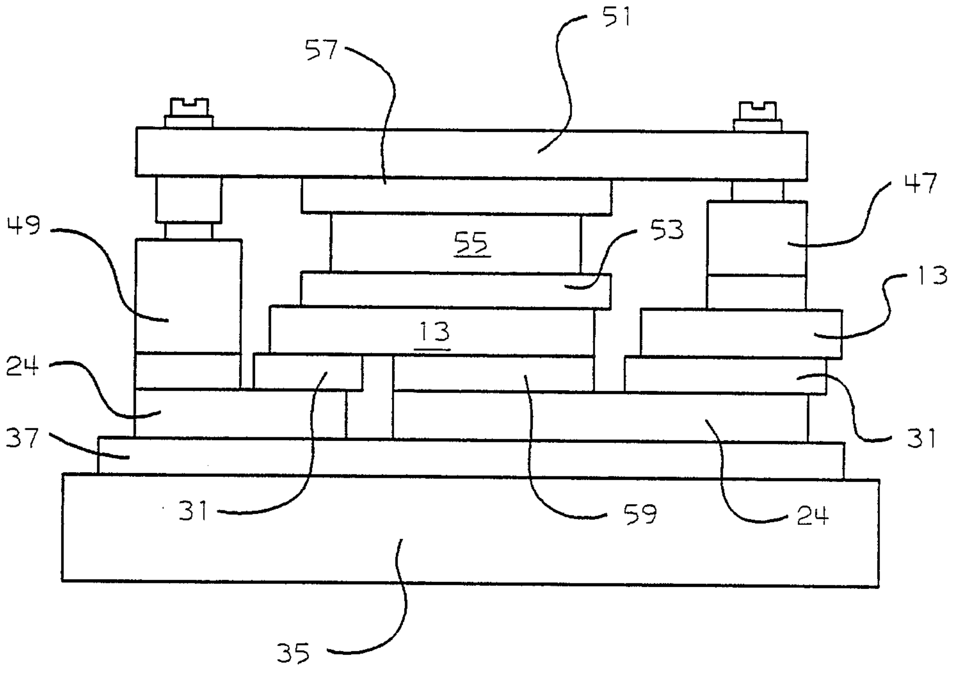
FIG. 3 is a cross-section view of the planar conductively cooled transformer taken along the line 3—3 of FIG. 1.

The design of the planar conductively cooled transformer is such that all assembly operations are a sequential placement of parts once the primary coils are attached to the secondary plates. Referring to FIGS. 2 and 3, a plurality of studs, not shown, are placed on the base plate 35 and function as alignment pins for subsequent layers. Next, the bottom core half 43 is positioned in the pocket of the base plate 35, while insulator 37, secondary winding 24, insulator 31, secondary tap shorting shim 59, and secondary winding 13 are added in sequence. The upper core half 45 is then added and secured with appropriate hardware, not shown. The secondary plates require insulated bushing in mounting bolt holes to avoid shorts between secondaries or to the mounting plates.

Referring specifically to FIG. 3, which shows further details of the rectifier section of the switching regulator, the output diodes 47 and 49 are placed on the extended secondary windings 24 and 13 respectively. Insulator 53, thermal transfer block 55 and insulator 57 are then added and positioned in sequence. The diodes 47 and 49 are then connected with the output bus 51 to provide an output of the assembly. The entire assembly is then secured with nuts, screws and miscellaneous conventional hardware, not shown. The above described design allows effective use of high automated assembly equipment (robots) and may be produced currently with final assembly of the supply, eliminating sub-assembly procurement and inventory control.

While the invention has been particularly shown and described with reference to a preferred embodiment thereof, it will be understood by those skilled in the art that various changes in form and detail may be made therein without departing from the spirit and the scope of the invention.

We claim:

1. In a switching regulator for generating high output current to a load, the combination comprising;

a transformer rectifier assembly including a pair of rectifiers and a transformer, said transformer having primary and secondary windings and a core of magnetic material linking the same;

said primary winding being juxtaposed to said secondary winding;

said secondary winding comprising a pair of plates, one overlying the other, said plates being planar and generally rectangular, each of said plates having an aperture to receive a common portion of said core and a slit extending from said aperture to the perimeter of the plate, said slits being positioned in angularly related directions to thereby define between them a common center tap portion of said winding;

said rectifiers being mounted on the resulting portions of said plates at opposite sides of said center tap; and said transformer rectifier assembly being mounted on a cooling medium whereby the heat generated by said transformer windings and said rectifiers is conducted to and dissipated by said cooling medium.

2. Apparatus as claimed in claim 1 wherein said plates extend beyond said aperture in a direction opposite from the position of said center tap to form a cooling tab.

3. Apparatus as claimed in claim 2, wherein said cooling tab comprises a short but wide area thermo-interface providing a substantial thermal condition path means for heat transfer.

4. In a switching regulator for generating high output current to a load, the combination comprising;

a transformer rectifier assembly including a rectifier and a transformer, said transformer having primary and secondary windings and a core of magnetic material linking the same;

said primary winding being juxtaposed to said secondary winding;

said secondary winding comprising a plate; said plate being planar and having an aperture to receive a portion of said core and a slit extending from said aperture to the perimeter of the plate;

said rectifier being mounted on a leg of said plate at one side of said slit and providing a first terminal of said secondary winding;

a second terminal at an end portion of said plate at the other side of said slit;

said plate being generally rectangular and extending substantially beyond the main current path defined by said rectifier, said terminal and said aperture, and said transformer rectifier assembly being mounted on a cooling medium, said medium being in thermal contact with substantially the entirety of said plate, whereby the heat generated by said transformer windings and said rectifier is conducted to an dissipated by said cooling medium.

* * * * *